(12) United States Patent
Suzuki

(10) Patent No.: US 7,006,323 B1
(45) Date of Patent: Feb. 28, 2006

(54) MAGNETIC HEAD FOR PROXIMITY RECORDING

(75) Inventor: Shoji Suzuki, San Jose, CA (US)

(73) Assignee: Komag, Inc., San Jose, CA (US)

( * ) Notice: Subject to any disclaimer, the term of this patent is extended or adjusted under 35 U.S.C. 154(b) by 163 days.

(21) Appl. No.: 10/623,025

(22) Filed: Jul. 18, 2003

(51) Int. Cl.
*G11B 5/60* (2006.01)
*G11B 21/21* (2006.01)

(52) U.S. Cl. ..................................... 360/75; 360/237.1
(58) Field of Classification Search ................. 360/75, 360/69, 234.3, 235.4, 236.4, 236.6, 237.1
See application file for complete search history.

(56) References Cited

U.S. PATENT DOCUMENTS

| | | | |
|---|---|---|---|
| 5,067,037 A | 11/1991 | Ananth et al. | |
| 5,214,291 A | 5/1993 | Hirai et al. | |
| 5,267,104 A | 11/1993 | Albrecht et al. | |
| 5,353,182 A | 10/1994 | Nakamura et al. | |
| 5,396,387 A | 3/1995 | Murray | |
| 5,424,888 A | 6/1995 | Hendriks et al. | |
| 5,508,861 A * | 4/1996 | Ananth et al. | 360/235.4 |
| 5,663,853 A | 9/1997 | Park | |
| 5,687,046 A | 11/1997 | Mathews | |
| 5,841,608 A | 11/1998 | Kasamatsu et al. | |
| 6,080,043 A | 6/2000 | LeVan | |
| 6,125,005 A | 9/2000 | Lee et al. | |
| 6,144,528 A | 11/2000 | Anaya-Dufresne et al. | |
| 6,181,519 B1 | 1/2001 | Kim | |
| 6,181,521 B1 | 1/2001 | Yonemura et al. | |
| 6,229,672 B1 | 5/2001 | Lee et al. | |
| 6,333,835 B1 | 12/2001 | Kang et al. | |
| 6,344,948 B1 | 2/2002 | Tang et al. | |
| 6,351,345 B1 * | 2/2002 | Kameyama | 360/236.3 |
| 6,452,752 B1 * | 9/2002 | Boutaghou | 360/237.1 |
| 6,510,027 B1 | 1/2003 | Chapin et al. | |
| 6,597,537 B1 * | 7/2003 | Tokuyama et al. | 360/236.6 |
| 6,674,612 B1 * | 1/2004 | Boutaghou et al. | 360/236.4 |
| 6,687,088 B1 * | 2/2004 | Boutaghou et al. | 360/237.1 |
| 6,710,964 B1 | 3/2004 | Rao et al. | |
| 6,754,043 B1 * | 6/2004 | Kasamatsu et al. | 360/235.8 |
| 2001/0043438 A1 | 11/2001 | Gui et al. | |
| 2001/0053046 A1 | 12/2001 | Koishi | |
| 2002/0001157 A1 | 1/2002 | Kang et al. | |
| 2002/0008939 A1 * | 1/2002 | Boutaghou et al. | 360/235.8 |
| 2002/0018320 A1 | 2/2002 | Levi et al. | |
| 2002/0057532 A1 | 5/2002 | Kurita et al. | |
| 2002/0093765 A1 | 7/2002 | Bolasna et al. | |

(Continued)

OTHER PUBLICATIONS

Junguo Xu et al. "Contact Vibration of Micro-Textured Sliders", Journal of Tribology, Apr. 2002, vol. 124, pp. 281-287.

*Primary Examiner*—David Hudspeth
*Assistant Examiner*—James L Habermehl
(74) *Attorney, Agent, or Firm*—Blakely, Sokoloff, Taylor & Zafman LLP

(57) ABSTRACT

A slider having a protrusion extending beyond an air bearing surface of the slider to maintain the slider with a positive pitch angle during contact with the surface of a disk. The protrusion may be disposed on a leading edge step of the slider body with the protrusion extending beyond the air bearing surface.

The slider may be used in a load/unload disk drive system to provide a positive pitch attitude to the slider at all times during operations of the disk drive system.

31 Claims, 11 Drawing Sheets

U.S. PATENT DOCUMENTS

| | | |
|---|---|---|
| 2002/0097526 A1 | 7/2002 | Martin et al. |
| 2002/0127499 A1 | 9/2002 | Endo et al. |
| 2002/0131209 A1 | 9/2002 | Anaya-Dufresne et al. |
| 2002/0159193 A1 | 10/2002 | Hall |
| 2002/0176210 A1 | 11/2002 | Hamilton |
| 2002/0181153 A1 | 12/2002 | Kang |
| 2003/0026038 A1 | 2/2003 | Zeng et al. |
| 2003/0090833 A1 * | 5/2003 | Tani et al. ............... 360/110 |

* cited by examiner

MAGNETIC HEAD FOR PROXIMITY RECORDING

TECHNICAL FIELD

Embodiments of this invention relate to the field of disk drives and, in particular, to the magnetic recording heads used in disk drives.

BACKGROUND

In current disk drive systems that employ flying heads, there is a protective film of air between the head and the disk, where no contact is intended to occur during head read/write operations. The read/write head is typically a part of or affixed to a larger body that flies over the disk and is typically referred to as a "slider." The slider also includes a surface referred to as an air bearing surfaces (ABS). The ABS has aerodynamic effects such as compression or expansion of air to generate positive or sub-ambient pressure. The ABS may include a flat surface, step, cavity, and/or taper. The ABS may also be referred to as a rail in the industry. The slider's body is attached to a suspension arm via a head gimbal assembly that biases the slider body towards the disk. The net effect of the ABS and the suspension arm is to cause the slider to fly at the desired height when the disk is at full speed. During normal flying conditions, the slider maintains a positive pitch attitude as illustrated in FIG. 1A.

Continuous improvements have been made in increasing the areal density (i.e., the number of stored bits per unit of surface area) of the magnetic recording disks. As is well known, decreasing the fly height of the read/write element (head), for example, results in reduced PW50 (the pulse width where the read head output amplitude, in response to an isolated transition, is 50% of the peak value) that allows for greater recording density. Bringing the head closer to the media has been a key area of effort in increasing recording densities.

As the fly height of a head in disk drive systems decreases, the probability of intermittent contacts between the slider and the disk surface increases. The friction generated between the disk and the trailing edge of the slider may cause a pitch low attitude that can lead to "choking" of the ABS. Once the air supply to the ABS becomes insufficient, the slider stalls resulting in head contact with the disk surface that may be exacerbated by slider vibrations. This is particularly problematic when the disk surface is very smooth and the friction force becomes sufficient to give enough force to the slider to pitch down resulting in a negative pitch attitude as illustrated in FIG. 1B.

One solution to reduce head contacts is to add stability to the slider by designing an air bearing with low pitch attitude. One problem with such a solution is that even if the slider has good stability, it may not be sufficient to prevent the contact especially during extreme conditions such as low RPM servo-writing or high altitude operation. Because the slider is supported by the air bearing and the trailing edge that contacts the disk is pulled by the frictional contact force, the slider tips over such that the pitch angle of the slider can be made negative. Once this condition occurs, the slider may not be easily recovered. The slider oscillations from tip over and attempted recovery may produce slider collisions with the disk surface potentially resulting in damage to the read/write head element and/or data surface of the disk. Further, the slider oscillations cause servo writing failures due to the production of an unstable signal.

Other solutions intended to reduce friction when slider contacts occur in contact-start-stop (CSS) drives include texturing the slider, design a slider having a positive crown (longitudinal curvature to the air bearing surface contour), or using multiple pads on the ABS of the slider. CSS drive systems dedicate a portion of the disk's surface, referred to as the CSS zone, for the slider to reside when the drive is not in operation. With this type of system, the slider directly contacts the disk's surface in the CSS zone.

Although such solutions may reduce the friction between the slider and disk surface in CSS drives, they may not be able to prevent negative pitch conditions from occurring. In particular, some prior solutions in CSS drives utilizing multiple pads may not prevent a negative pitch attitude of the slider because the height of the pads with respect to the disk surface is equal, thereby resulting in zero pitch angle that positions the slider in an unstable attitude, as illustrated in FIG. 1C. Other prior solutions in CSS drives utilize a protrusion located centrally off the forward portion of a slider that projects below the air bearing surface, as illustrated in FIG. 1D. The protrusions have been disposed either on a frontal ramp (tapered) section of a slider or aft of such a ramp section. The protrusion provides a positive pitch when the slider is at rest on a stationary disk. The intent of the protrusion is to reduce the stiction force between the slider and the disk surface when the slider is lifted off of the disk's surface. Therefore, such a protrusion may not be sufficient in preventing negative pitch attitude of the head in operation and may not be optimum for use in a load/unload disk drive system that requires no contact between a slider and disk.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth such as examples of specific materials or components in order to provide a thorough understanding of the present invention. It will be apparent, however, to one skilled in the art that these specific details need not be employed to practice the invention. In other instances, well known components or methods have not been described in detail in order to avoid unnecessarily obscuring the present invention. The term "coupled" as used herein means connected directly to or connected through one or more intervening components.

A method and apparatus is described for a slider having a protrusion extending beyond an air bearing surface of the slider to maintain the slider with a positive pitch angle during contact with the surface of a disk. In one embodiment, the slider may include a slider body having an air bearing surface, a leading edge step and a protrusion that is disposed on the leading edge step and that extends beyond the air bearing surface. In one embodiment, the slider may be used in a load/unload disk drive system to provide a positive pitch attitude to the slider at all times during operations of the disk drive system.

In one embodiment, a disk drive having the slider may be designed by determining a pitch angle of operation for the slider and then determining a height of a protrusion disposed on the slider based on the determined pitch angle. The height of the protrusion extends beyond the air bearing surface of the slider and the height is proportional to a distance of a read/write element from the protrusion and the minimum pitch angle of the slider.

Figure 1B:
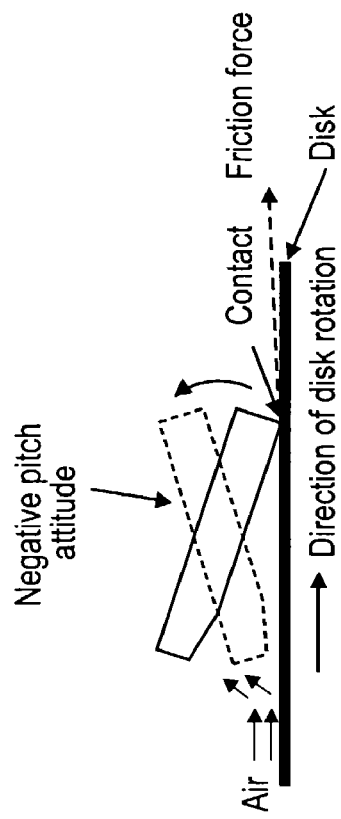
FIG. 1B illustrates the pitch down of a slider resulting in a negative pitch attitude.
Figure 1A:
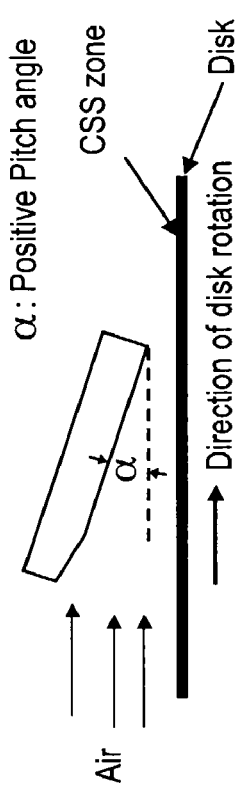
FIG. 1A illustrates the positive pitch attitude of a slider during normal flying conditions in a disk drive.
Figure 1C:
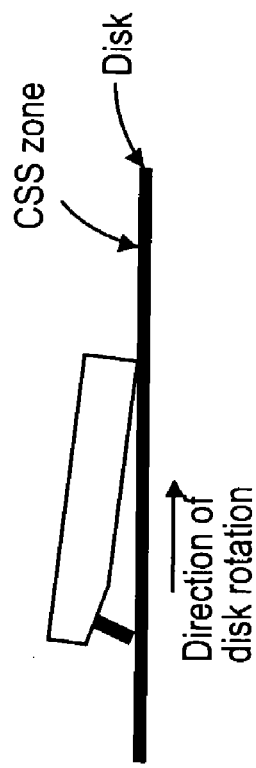
FIG. 1C illustrates a prior slider having multiple pads of equal height.
Figure 1D:
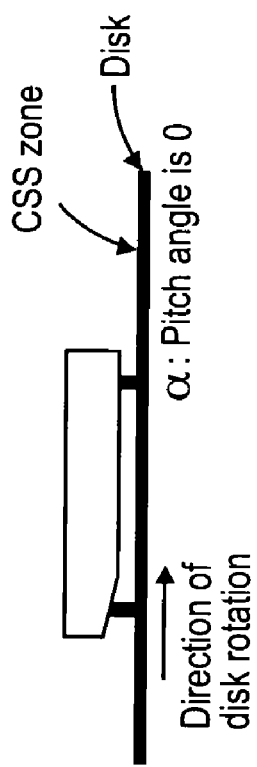
FIG. 1D illustrates a prior CSS disk drive system slider.
Figure 2A:
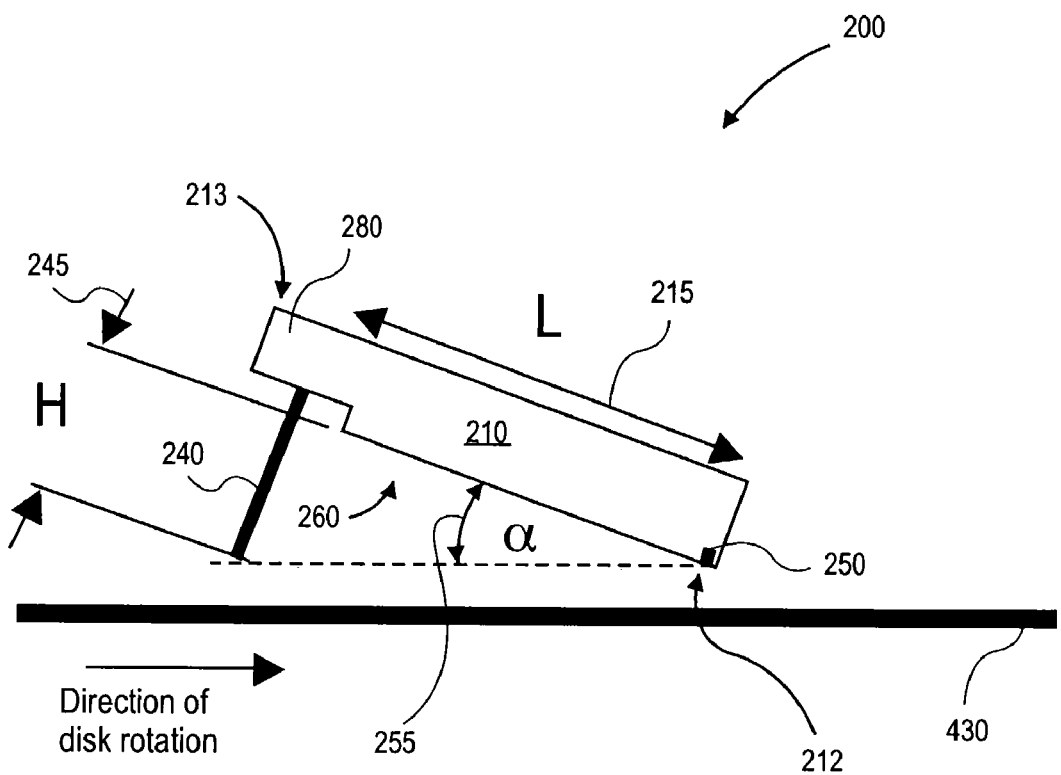
FIG. 2A illustrates one embodiment of a slider having a protrusion.

FIG. 2A illustrates one embodiment of a slider having a protrusion. Slider 200 includes a slider body 210, protrusion 240, read/write element 250, and air bearing surface 260. The slider body 210 is attached to a suspension 460 of FIG. 4 via a head gimbal assembly that load biases the slider body 210 towards the disk 430. The net effect of the air bearing surface 260 and the suspension is to cause the slider 200 to fly at a desired height above disk 430 when the disk is rotating. The air bearing surface 260 may include one or more rails that generate a positive air pressure under slider 200. In addition, slider 200 may include a cavity (e.g., cavity 307 of FIG. 3) or similar structure between the rails that creates a sub-ambient pressure to counterbalance the positive pressure generated by suspension arm 460, of FIG. 4, to some extent. Air bearing surfaces and rails are known in the art; accordingly, a more detailed discussion is not provided.

In the embodiment illustrated in FIG. 2A, a protrusion 210 (e.g., pad, bump, bar, projection, protuberance, etc.) is disposed on leading edge step 280. Protrusion 210 extends beyond air bearing surface 260 by a height (H) 240 to maintain the slider 200 with a positive pitch angle (a) 255 during contact with the surface of a disk. The height 245 of protrusion 210 is selected in order to maintain the slider with positive pitch angle 255 during contact of protrusion 245 with the surface of a disk.

In one embodiment, the height (H) 245 of protrusion 240 extending beyond air bearing surface 260 may be proportional to a distance (L) 215 of a read/write element 250 from protrusion 240 and a determined pitch angle 255 of operation for the slider 200. In particular, pitch angle 255 may be determined as follows:

$$\tan \alpha = H/L.$$

The pitch angle 255 may be determined under various conditions of operation. In one embodiment, pitch angle 255 may be the minimum pitch angle found in extreme conditions of operation for a disk drive such as servo writing or high altitude operations of slider 200 that are still within a specification for the disk drive. For example, if the minimum pitch angle 255 is determined to be 50 micro radians within a 10% specification window, then the height 245 of the protrusion 240 may be determined as follows:

$$L \times \tan (90\% \text{ of } \alpha) < H < L \times \tan (110\% \text{ of } \alpha).$$

In an exemplary embodiment, slider 200 may be a pico slider. Pico sliders have reduced form factor and lower total contact area with the disk surface. Assuming for example that L=1 millimeter, with a pitch angle 255 of 50 micro radians, the optimum height 245 for protrusion 245 may be determined to be in the range of 450 and 550 Angstroms. It should be noted that the protrusion 240 may have other heights less than 450 Angstroms or greater than 550 Angstroms. For example, the protrusion heights may be on the order of 100 Angstroms or 1,000 Angstroms depending its distance from a read/write element and the pitch angle of the slider body. Moreover, other conditions, dimensions, and operating parameters may be used to determine pitch angle 255. Further, the method and apparatus discussed herein may be used with large sliders or smaller sliders (e.g., nano sliders).

During collisions with a disk, the trailing edge 212 of slider 200 will make initial contact with the surface of the disk. Because the slider 200 is supported by air bearing surface 260 and the trailing edge 212 that contacts the disk is pulled by frictional contact force, a torque is generated that induces the slider 210 to tip over. Without the use of protrusion 240, such torque would force the pitch angle of the slider to become negative. A negative pitch attitude of the slider may prevent air from flowing under the air bearing surface of the slider and choke the air bearing surface.

Figure 2B:
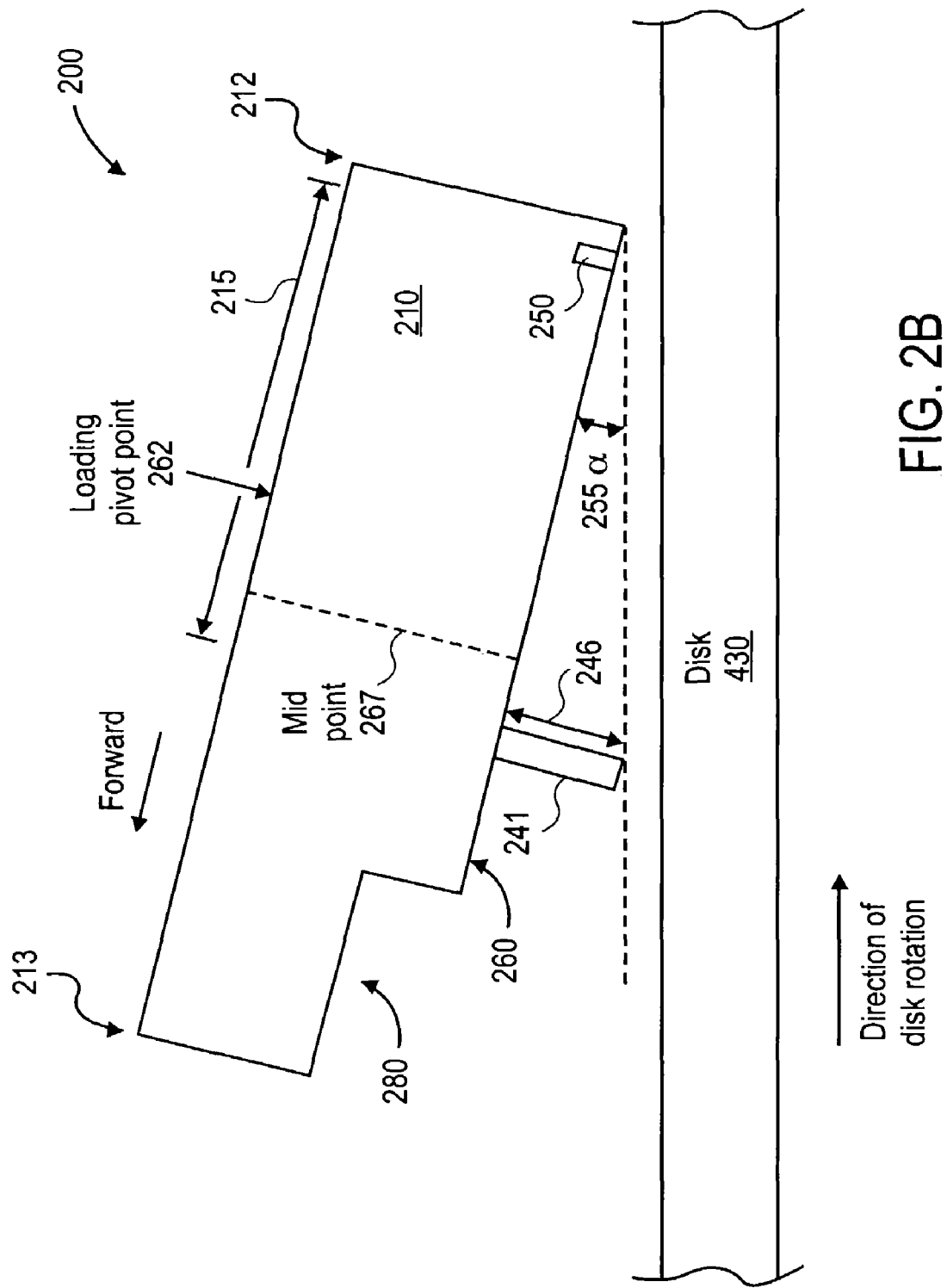
FIG. 2B illustrates an alternative embodiment of a slider having a protrusion.

Slider 200 has a pivot point 263 produced from the load force applied by suspension arm 430. By utilizing a protrusion 240 disposed on the slider body 210 forward of the load pivot point 263, the friction generated between slider 200 and disk 430 may be reduced and disk contact with the leading edge 213 may be prevented. Although protrusion 240 is illustrated in FIG. 2A as disposed on leading edge step 280, the protrusion may be disposed on the underside of body 210 at any position forward of load pivot point 262 as illustrated by protrusion 241 in FIG. 2B. In the alternative embodiment illustrated in FIG. 2B, protrusion 241 is disposed on the under side of body 210 between leading edge step 280 and the mid point 267 of body 210. The height 246 of the protrusion 241 may be determined in a manner similar to that discussed above with respect to protrusion 240.

Figure 3:
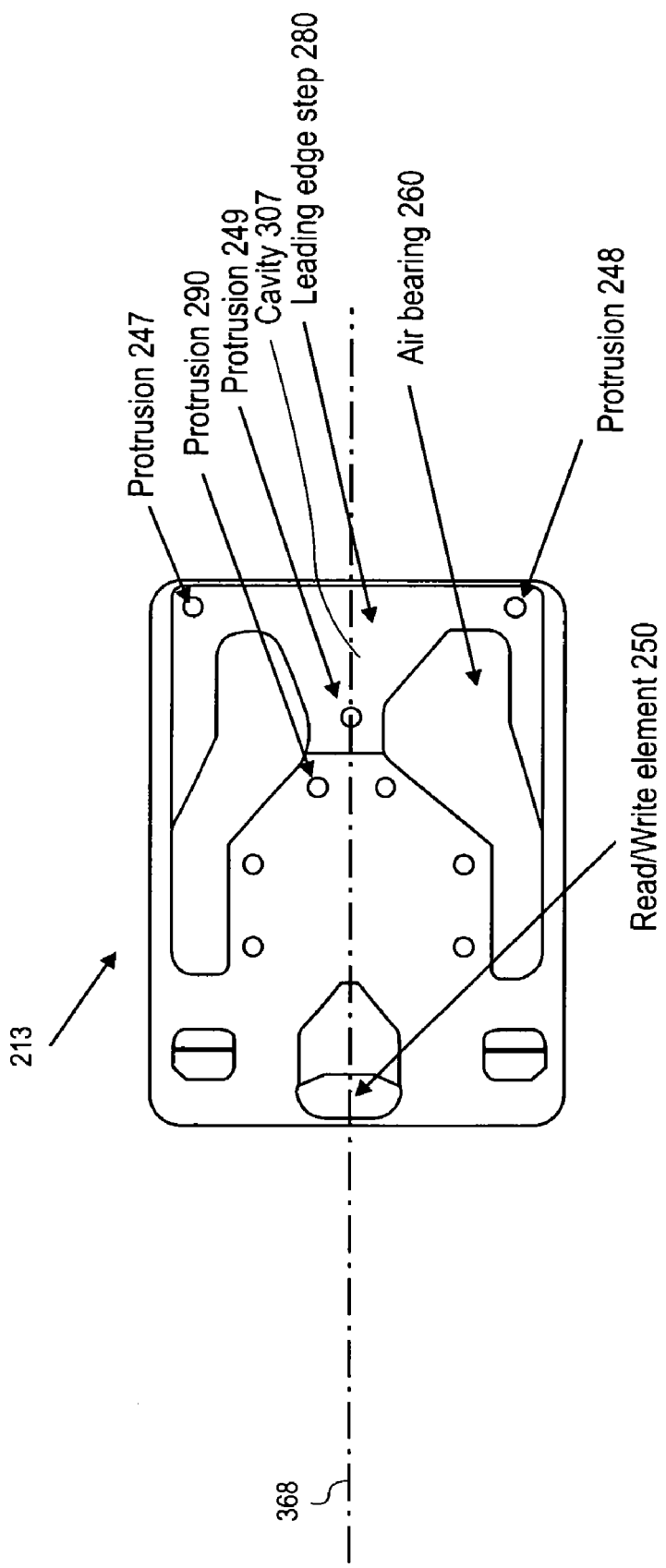
FIG. 3 is an underside view illustrating one embodiment of components of a slider.

In an alternative embodiment, slider 200 may include multiple protrusions at any position forward of load pivot point 262, for example, as illustrated in FIG. 3. FIG. 3 is an underside view illustrating one embodiment of a slider having multiple protrusions. In this embodiment, slider 200 includes three protrusion 247, 248 and 249 disposed on leading edge step 280. Protrusions 247 and 248 may be disposed approximately equidistant from center line 368 of body 210 and read/write element 250. Protrusion 249 may be disposed on center line 368 further away from leading edge 213 than protrusions 247 and 248. The heights of each of protrusions 247, 248 and 249 may be determined in a manner similar to that discussed above for protrusion 240 to achieve a desired pitch angle 255 for the slider body 210.

Figure 8A:
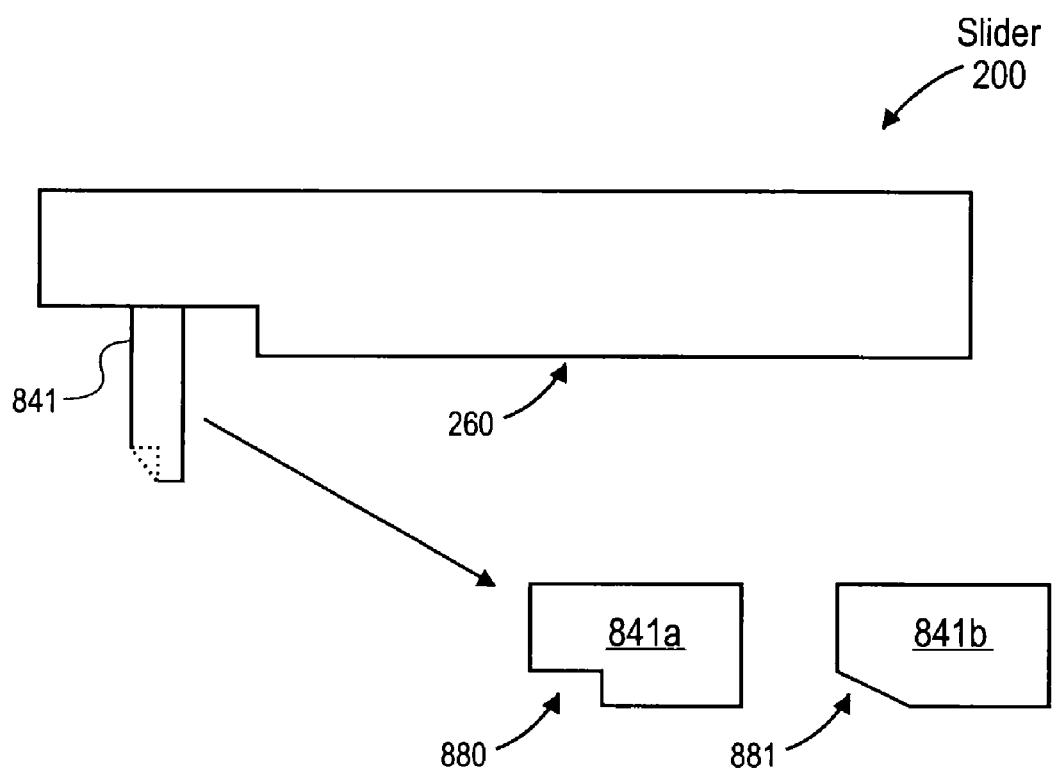
FIG. 8A illustrates an alternative embodiment of a protrusion.
Figure 8B:
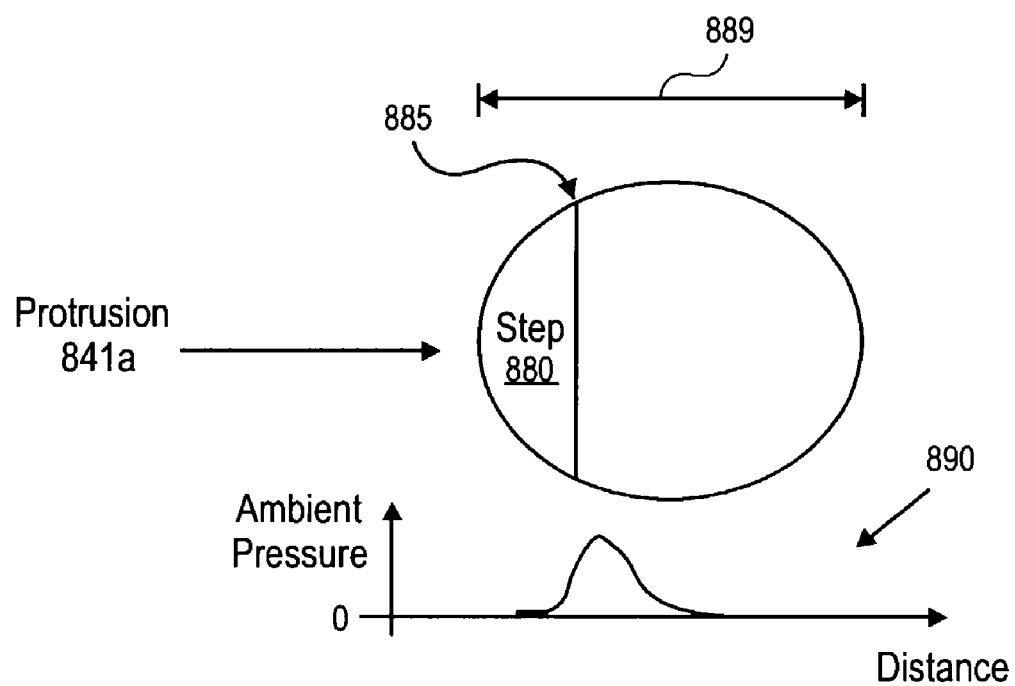
FIG. 8B shows an underside view of one embodiment of a protrusion having step along with an exemplary illustration of the pressure distribution under the protrusion along its length.

FIG. 8A illustrates an alternative embodiment of a protrusion. In this embodiment, slider 200 includes a protrusion 841 having a leading edge contour or shape as illustrated by, for examples, step 880 of protrusion of 841*a* and taper 881 of protrusion 841*b*. Alternatively, protrusion 841 may have other shapes or contours. Protrusion 841 may have an air bearing effect generated by contour, or shape, of its leading edge. If protrusion 841 has air bearing effect, counter force against the friction force during contact between protrusion 841 and disk 830 can be created by both positive air pressure under protrusion 841 and mechanical force between protrusion 841 and the surface of disk 430, as illustrated in FIG. 8B. FIG. 8B shows an underside view of protrusion 841*a* having step 880 along with an exemplary illustration of the pressure distribution under protrusion 841*a* along its length 889. As can be seen by graph 890, the ambient pressure under protrusion 841*a* may increase toward the step boundary 885, thereby generating a greater counter force against the contact force between protrusion 841*a* and disk 830.

Protrusions 240, 241, 247, 248, 249 and 841 may have various shapes and dimensions. In one embodiment, protrusions may 240, 241, 247, 248, 249 and 841 may have a round or oval cross-sectional shape with a diameter in the range, for example, of approximately 35–50 microns wide. Alternatively, other cross-sectional shapes (e.g., square, rectangular, etc.) and dimensions may be used. It should be noted that where slider 200 includes multiple protrusions, one or more of the protrusions may have different shapes and dimensions than other protrusions. In one embodiment, the protrusions material may include, for examples, carbon, hydrogen-doped carbon, nitrogen-doped carbon, or silicon carbide (SiC). Alternatively, other materials may be used for the protrusions and, in particular, materials that provide strong adhesion to slider body 210 and hardness so as to remain in place and not significantly wear over an operating lifetime.

In alternative embodiments, slider 200 may also include additional protrusions (e.g., protrusion 290) on its under side, having heights less than the heights (e.g., 245, 246, 247, 248 or 249) of the protrusions. The additional protrusions may be located closer to read/write element 250, for example, to protect it from contact with the surface of disk 430.

Figure 4:
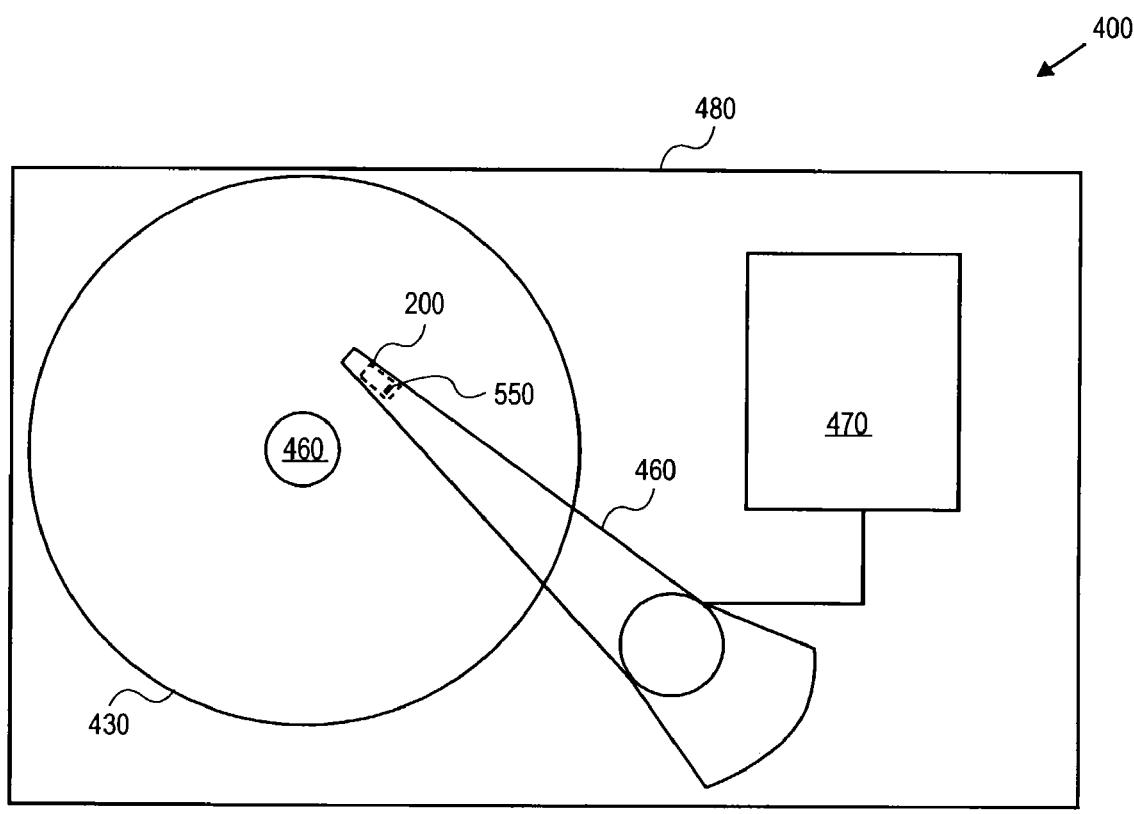
FIG. 4 illustrates a disk drive system having an embodiment of a slider

FIG. 4 illustrates one embodiment of a disk drive having slider 200. Disk drive 400 may include one or more disks 430 to store data along tracks in a magnetic recording layer of disk 430. Disk 430 resides on a spindle assembly 460 that is mounted to drive housing 480. A spindle motor (not shown) rotates spindle assembly 460 and, thereby, disk 430 to position a head 550 on slider 200 at a particular location along a desired disk track. The position of head 550 relative to disk 430 may be controlled by position control circuitry 570.

The slider body 210 is attached to a suspension 460 via a gimbal assembly that load biases the slider body 210 towards the disk 430. The net effect of the air bearing surface 260 of slider 200 and the suspension 460 is to cause the slider 200 to fly at a desired height above disk 430 when the disk is rotating. Although illustrated with only a single disk and a single side for ease of discussion, disk drive 400 may include double side disks and multiple (single sided and/or double sided) disks in which each side of a disk may have a corresponding slider and suspension arm assembly.

Figure 5:
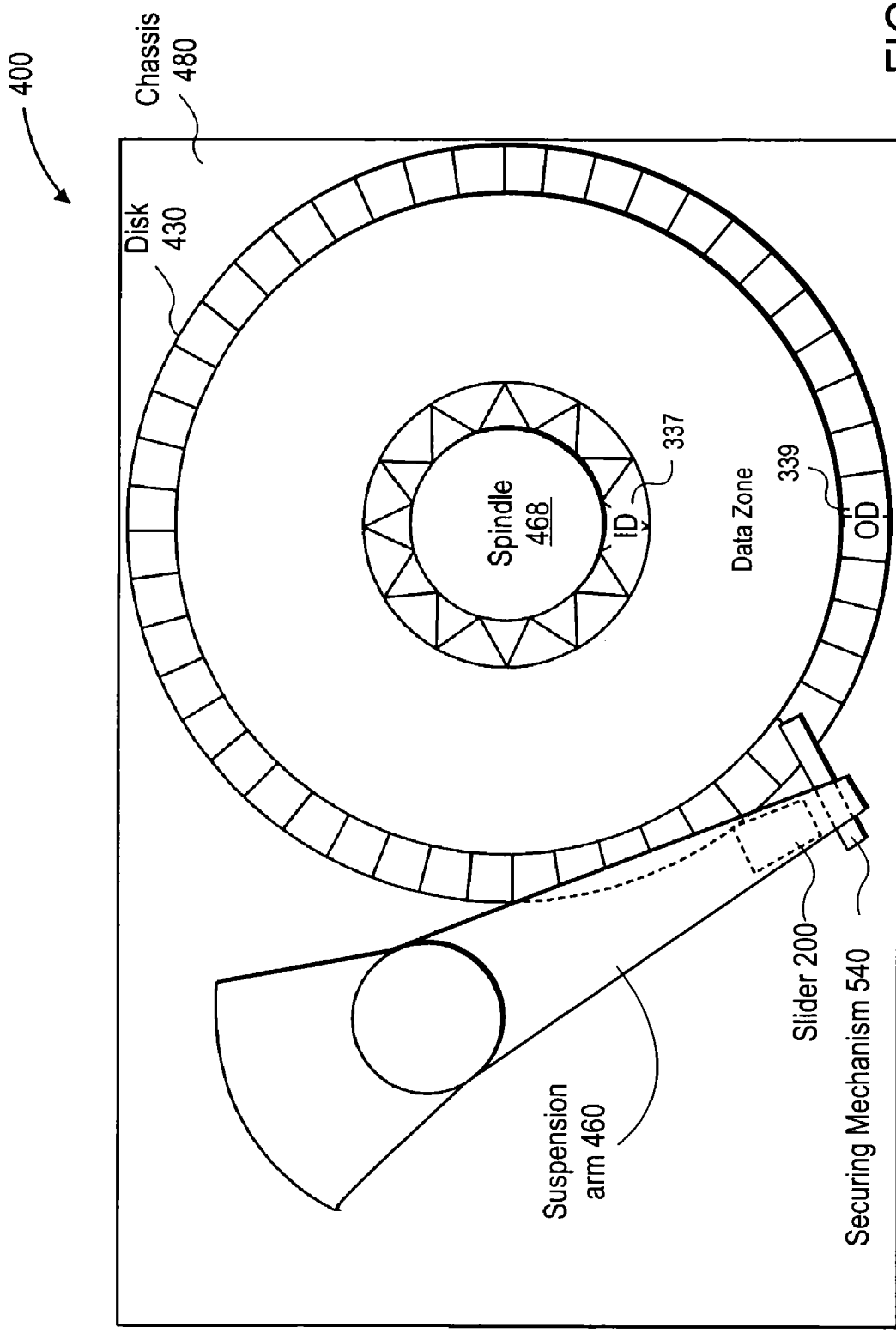
FIG. 5 is a top view illustrating a load/unload disk drive system having an embodiment of a slider.
Figure 6:
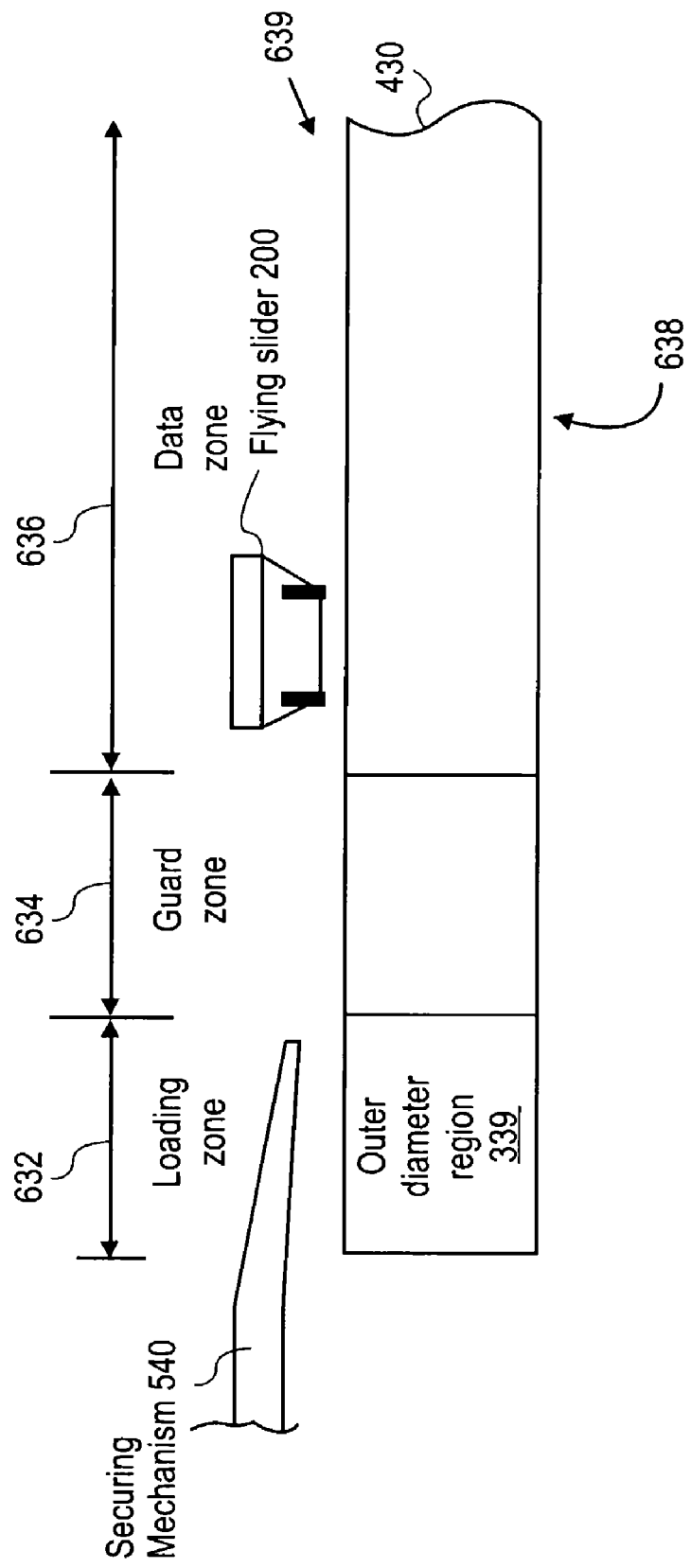
FIG. 6 is a cross sectional view illustrates a load/unload disk drive system having an embodiment of a slider.

The reading and writing of data is accomplished with head 550 of slider 200. Head 550 includes both read and write elements. The write element is used to alter the properties of the longitudinal or perpendicular magnetic recording layer of disk 430. In one embodiment, head 550 may have a magneto-resistive (MR) and, in particular, a giant magneto-resistive (GMR) read element and an inductive write element. In an alternative embodiment, head 550 may be another type of head, for example, an inductive read/write head or a Hall effect head. In an embodiment where disk drive 500 is a load/unload, the disk drive also includes a securing mechanism 540 such as a ramp upon which slider 200 is loaded and unloaded, as illustrated in FIGS. 5 and 6. Although the securing mechanism may be discussed herein in reference to a ramp, disk drive 500 is not limited to only a ramp type securing mechanism. In alternative embodiments, securing mechanism 540 may be other types of mechanisms known in the art, for example, a pneumatic mechanism to dynamically load/unload slider 200.

FIG. 5 is a top view illustrating a load/unload disk drive system having an embodiment of slider 200. In this embodiment, disk drive 400 is a load/unload disk drive system having a ramp 540. Ramp 540 is used to secure the slider 200 outside the outer diameter (OD) 339 edge of disk 430. A bottom portion of the ramp may extend over OD 339 of the disk. Before startup of disk drive 400, slider 200 is positioned on ramp 540. During startup, the suspension arm 460 moves slider 200 down ramp 540 so that slider 200 flies after clearing the bottom of ramp 540. During shut down of disk drive 400, the suspension arm 460 moves slider 200 up ramp 540 to its parked position at the top.

In an alternative embodiment, ramp 540 may be configured to secure slider 200 inside the inner diameter (ID) 337 edge of disk 430. The ramp may also be secured in disk drive 400 in various locations, for example, to the base of chassis 480, a cover (not shown), spindle hub 460, etc.

FIG. 6 is a cross sectional view illustrates a load/unload disk drive system having an embodiment of slider 200. Some disk drive systems also use a guard zone 634 next to the ID region 337 under the ramp 540. The guard zone 634 is a non-data region used to prevent loss of data due to possible head contact with disk 430 as the slider 400 transitions to flying condition. As previously noted disk drive 400 may also be configure to fly slider 200 on under side 638 of disk 430 instead of or in addition to top side 639. In addition, the ramp may be positioned in disk drive 400 to load and unload slider 200 from a position adjacent to the ID region 337. Correspondingly, a guard zone, if used, may be disposed adjacent the ID region 337. The use of a guard zone near ID region 337 may allow for the use of a disk's larger OD region 339 for data storage.

It should be noted that slider 200 is not limited to use only with load/unload disk drive systems. The slider 200 may also be used in contact-start-stop (CSS) drive systems that dedicate a portion of the disk's surface, referred to as the CSS zone, for the head to reside when the drive is not in operation. With this type of system, ramp 540 of FIGS. 5 and 6 is not utilized. Rather, slider 200 directly contacts the disk's surface in the CSS zone of disk 430. In order to increase the storage capacity of the disk 430, the ID region 337 on disk 430 may be used for the CSS zone. Alternatively, other regions such as a more central region or OD region 339 may be used for the CSS zone. In one embodiment, the CSS zone may have a texture pattern (e.g., a laser induced bump texture) that reduces stiction when the slider 200 lifts off from or lands on the surface of disk 430.

Figure 7:
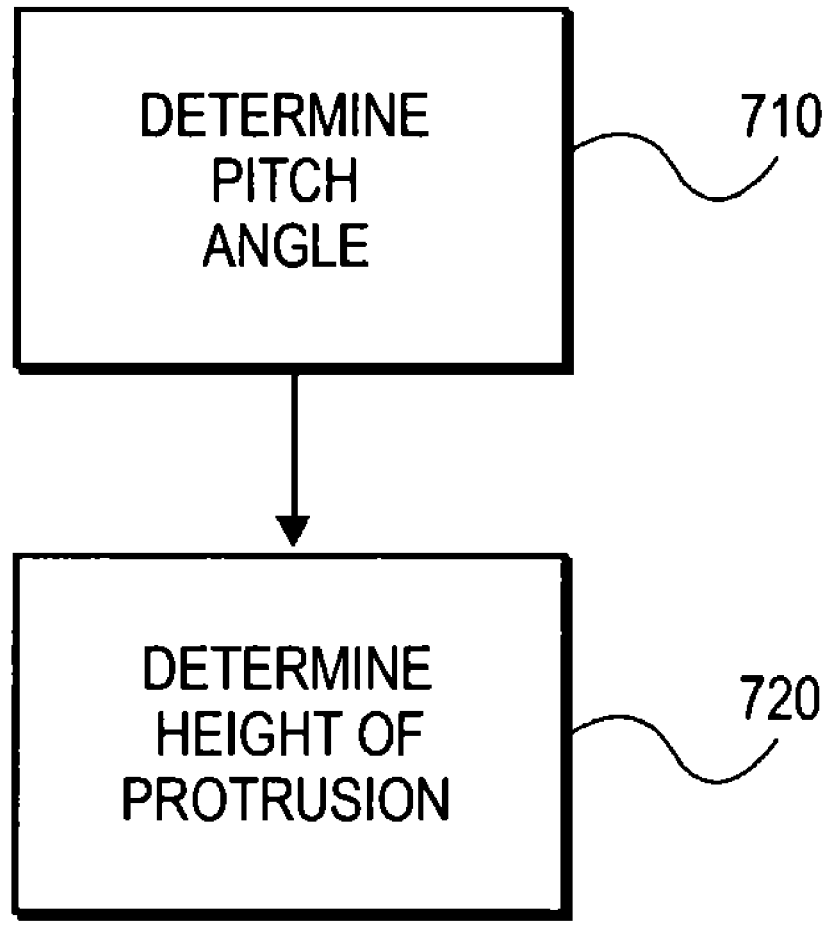
FIG. 7 illustrates one embodiment of a method of configuring the operation of a disk drive system.

FIG. 7 illustrates one embodiment of a method of configuring the operation of a disk drive system. In one embodiment, disk drive 400 may be designed by determining a pitch angle 255 of operation for the slider 200, step 710. Then, in step 720, the height of a protrusion (e.g., 240, 241, etc.) disposed on the slider is determined based on the determined pitch angle 255 and the distance of the protrusion from a read/write element 250 on slider 200.

As previously mentioned, pitch angle 255 may be the minimum pitch angle found in extreme operating conditions of disk drive 400 such as servo writing or high altitude operations of slider 200 that are still within a specification for the disk drive. The height of the protrusion is determined to maintain slider 200 with the positive pitch angle during contact between the slider body 210 and the surface of disk 430. In one embodiment, for example, the positive pitch angle 255 may be in the range of 20 to 50 micro radians. Alternatively, the height of the protrusion may be selected to provide a positive pitch angle 255 less than 20 micro radians or greater than 50 micro radians. In one such alternative embodiment, the height of the protrusion is selected to provide a positive pitch angle in approximately the range of 50 to 200 micro radians during sliding contact between slider 200 and disk 430.

In the foregoing specification, the invention has been described with reference to specific exemplary embodiments thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A load/unload disk drive, comprising:
   a suspension arm;
   a slider body coupled to the suspension arm, the slider body having a load pivot point, wherein the slider body comprises:
      an air bearing surface; and
      a first protrusion extending beyond the air bearing surface, the first protrusion being disposed on the slider body forward of the load pivot point; and
   a securing mechanism configured to receive the suspension arm to load and unload the slider body; and
   a disk having a data zone surface and wherein the protrusion maintains the slider body with a positive pitch attitude during contact between the slider body and the data zone surface of the disk.

2. The disk drive of claim 1, wherein the slider body has a mid point and wherein the first protrusion is disposed on the slider body forward of the mid point of the slider body.

3. The disk drive of claim 2, wherein the slider body has a leading edge and wherein the first protrusion is disposed on the slider body adjacent to the leading edge of the slider body.

4. The disk drive of claim 1, wherein the protrusion extends beyond the air bearing surface approximately 500 Angstroms or less.

5. The disk drive of claim 1, wherein the protrusion has a leading edge contour.

6. The disk drive of claim 1, wherein the slider body further comprises a second protrusion extending beyond the air bearing surface, wherein the first and second protrusions are disposed on the slider body forward of the load pivot point.

7. The disk drive of claim 6, wherein the slider body has a mid point and wherein the first and second protrusions are disposed on the slider body forward of the mid point of the slider body.

8. The disk drive of claim 7, wherein the slider body has a leading edge and wherein one of the first and second protrusions is disposed on the slider body nearer to the leading edge than the other of the first and second protrusions.

9. The disk drive of claim 7, wherein the slider body has a leading edge and wherein the first and second protrusions are disposed on the slider body substantially equally adjacent to the leading edge.

10. The disk drive of claim 6, wherein each of the first and second protrusions extend beyond the air bearing surface approximately 500 Angstroms or less.

11. The disk drive of claim 1, wherein the slider body has a leading edge step and wherein the first protrusion is disposed on the leading edge step.

12. The disk drive of claim 11, wherein each of the first protrusion extends beyond the air bearing surface approximately 500 Angstroms or less.

13. The disk drive of claim 1, further comprising a read/write head element coupled to the slider body, wherein the first protrusion has a height beyond the air bearing surface, the height being directly proportional to a distance of the read/write element from the first protrusion and a minimum specified pitch angle of operation for the slider body.

14. The disk drive of claim 1, wherein the positive pitch attitude comprises a pitch angle approximately in the range of 20 to 50 micro radians.

15. The disk drive of claim 1, wherein the positive pitch attitude comprises a pitch angle approximately in the range of 50 to 100 micro radians.

16. The disk drive of claim 1, wherein the positive pitch attitude comprises a pitch angle approximately in the range of 100 to 200 micro radians.

17. The disk drive of claim 1, wherein the protrusion extends beyond the air bearing surface a height approximately in the range of 200 to 300 Angstroms.

18. The disk drive of claim 1, wherein the protrusion extends beyond the air bearing surface a height approximately in the range of 300 to 400 Angstroms.

19. A slider, comprising:
   a slider body comprising:
      an air bearing surface;
      a leading edge step having a non-sloping surface; and
      a protrusion disposed on the leading edge step of the slider body, the protrusion extending beyond the air bearing surface, and wherein the protrusion has a contoured leading edge.

20. The slider of claim 19, further comprising a read/write head element, wherein the protrusion has a height beyond the air bearing surface, the height being directly proportional to a distance of the read/write element from the protrusion and a pitch angle of the slider body.

21. The slider of claim 19, wherein the pitch angle is approximately in the range of 20 to 50 micro radians during operation of the slider in a disk drive.

22. The slider of claim 19, wherein the pitch angle is approximately in the range of 50 to 200 micro radians during operation of the slider in a disk drive.

23. The slider of claim 19, further comprising a plurality of the protrusions disposed on the leading edge step.

24. A method, comprising:
   providing a slider body having a load pivot point, the slider body comprising:
      an air bearing surface; and
      a first protrusion extending beyond the air bearing surface, the first protrusion being disposed on the slider body forward of the load pivot point;

flying the slider body in a load/unload disk drive;
contacting the slider body with a disk surface over a data zone; and
maintaining a positive pitch angle of the slider body during the contacting.

25. The method of claim 24, wherein maintaining comprises maintaining the positive pitch angle to be approximately 50 micro radians or less.

26. The method of claim 24, wherein maintaining comprises maintaining the positive pitch angle to be approximately in the range of 50 to 200 micro radians.

27. The method of claim 24, wherein a friction force is generated during the contacting between the slider body and the disk surface over the data zone, and wherein the method further comprises generating a counter force against a contact force using a contour of the first protrusion.

28. A method of designing a slider for use in a disk drive, comprising:
determining a minimum pitch angle of operation for the slider, the slider comprising a read/write element and an air bearing surface; and
determining a height of a protrusion disposed on the slider body, the height of the protrusion extending beyond the air bearing surface, wherein the height is directly proportional to a distance of the read/write element from the protrusion and the minimum pitch angle of the slider.

29. The method of claim 28, wherein determining the minimum pitch angle comprises determining the minimum pitch angle during a servo writing operation within a specification of the disk drive.

30. The method of claim 28, wherein determining the minimum pitch angle comprises determining the minimum pitch angle during high altitude operation of the slider within a specification of the disk drive.

31. The method of claim 28, wherein the height of the protrusion is determined to be approximately 500 Angstroms or less.

* * * * *